US010495510B2

(12) United States Patent
Maor et al.

(10) Patent No.: US 10,495,510 B2
(45) Date of Patent: Dec. 3, 2019

(54) SYSTEMS AND METHODS FOR FLASH LOCALIZATION USING AT LEAST TWO PHOTODIODES

(71) Applicant: ELTA SYSTEMS LTD., Ashdod (IL)

(72) Inventors: Yaniv Maor, Modi'in (IL); Ori Aphek, Ramat Gan (IL)

(73) Assignee: ELTA SYSTEMS LTD., Ashdod (IL)

( * ) Notice: Subject to any disclaimer, the term of this patent is extended or adjusted under 35 U.S.C. 154(b) by 176 days.

(21) Appl. No.: 15/640,878

(22) Filed: Jul. 3, 2017

(65) Prior Publication Data

US 2018/0003554 A1 Jan. 4, 2018

(30) Foreign Application Priority Data

Jul. 3, 2016 (IL) .......................................... 246595

(51) Int. Cl.
*G01J 1/04* (2006.01)
*G01J 1/44* (2006.01)
*G01S 3/781* (2006.01)
*G01S 3/783* (2006.01)

(52) U.S. Cl.
CPC ............... *G01J 1/0418* (2013.01); *G01J 1/44* (2013.01); *G01S 3/781* (2013.01); *G01S 3/783* (2013.01); *G01J 2001/446* (2013.01)

(58) Field of Classification Search
CPC .... G01J 1/0418; G01J 2001/446; G01S 3/783
USPC .......................................... 250/203.4, 214 R
See application file for complete search history.

(56) References Cited

U.S. PATENT DOCUMENTS

| 2,700,318 | A | 1/1955 | Snyder |
| 3,780,300 | A | 12/1973 | Kott |
| 5,276,496 | A | 1/1994 | Heller et al. |
| 5,970,024 | A | 10/1999 | Smith |
| 6,410,897 | B1 | 6/2002 | O'Neill |
| 6,521,882 | B1 * | 2/2003 | Sumiya ..................... G01J 1/04  250/203.4 |
| 7,205,520 | B1 | 4/2007 | Busse et al. |
| 7,978,320 | B2 | 7/2011 | Wada |
| 9,312,805 | B2 * | 4/2016 | Gustafson ........... H01L 31/0543 |

(Continued)

FOREIGN PATENT DOCUMENTS

| EP | 2533001 A1 | 12/2012 |
| GB | 2188507 A | 9/1987 |
| WO | 01/20361 A1 | 3/2001 |

*Primary Examiner* — Que Tan Le
(74) *Attorney, Agent, or Firm* — Oliff PLC

(57) ABSTRACT

A flash detection device comprises at least a first and a second sensor module, wherein each of the sensor modules comprises at least a photodiode for detecting an irradiance emitted by a source, and the first sensor module comprises at least an angular efficiency attenuator configured for attenuating the irradiance received by the photodiode according to a predetermined angular efficiency profile, wherein the at least first and second sensor modules are configured for collecting light from substantially the same field of view, and the angular efficiency attenuator of the first sensor module causes the first and second sensor modules to have complementary predetermined angular efficiency profiles, so that, for angles of view within a common field of view of the first and second sensor modules, a combination of irradiance measurements of the first and second sensor modules enables to derive an irradiance source angle of the source.

19 Claims, 16 Drawing Sheets

(56) References Cited

U.S. PATENT DOCUMENTS

| | | |
|---|---|---|
| 2007/0017281 A1 | 1/2007 | Rodgers et al. |
| 2007/0052806 A1 | 3/2007 | Bnayahu et al. |
| 2008/0208514 A1 | 8/2008 | Weber et al. |
| 2008/0314234 A1 | 12/2008 | Boyd et al. |
| 2008/0316462 A1 | 12/2008 | Riel et al. |
| 2009/0039197 A1 | 2/2009 | Maynard et al. |
| 2009/0226109 A1 | 9/2009 | Warren et al. |
| 2011/0141476 A1 | 6/2011 | Schmaelzle et al. |
| 2012/0150484 A1 | 6/2012 | Odhner |
| 2012/0286147 A1 | 11/2012 | Hvass et al. |

* cited by examiner

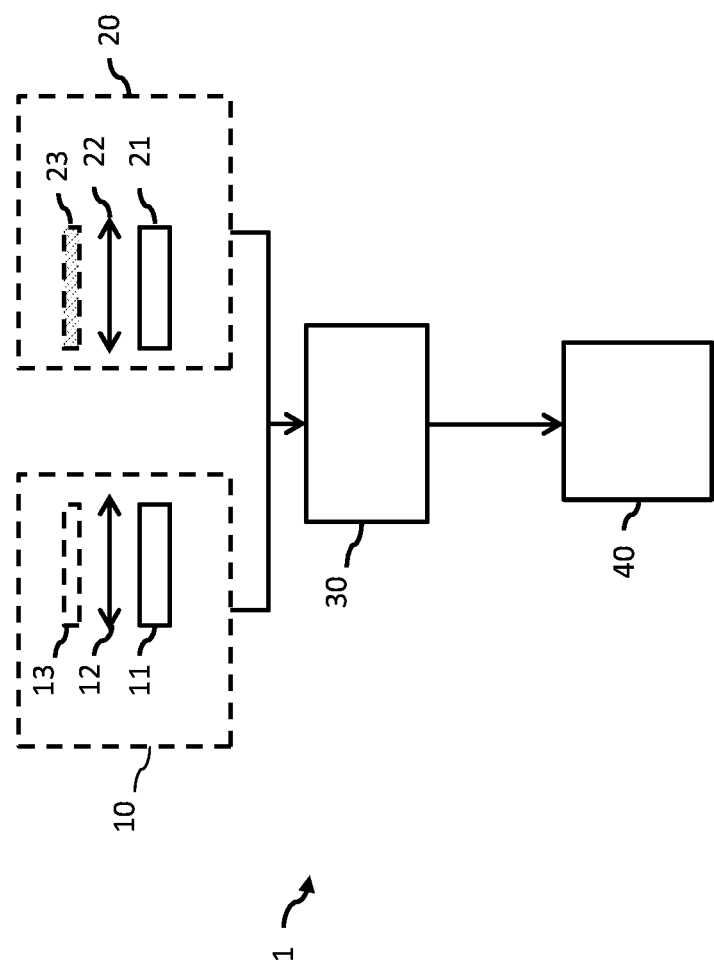

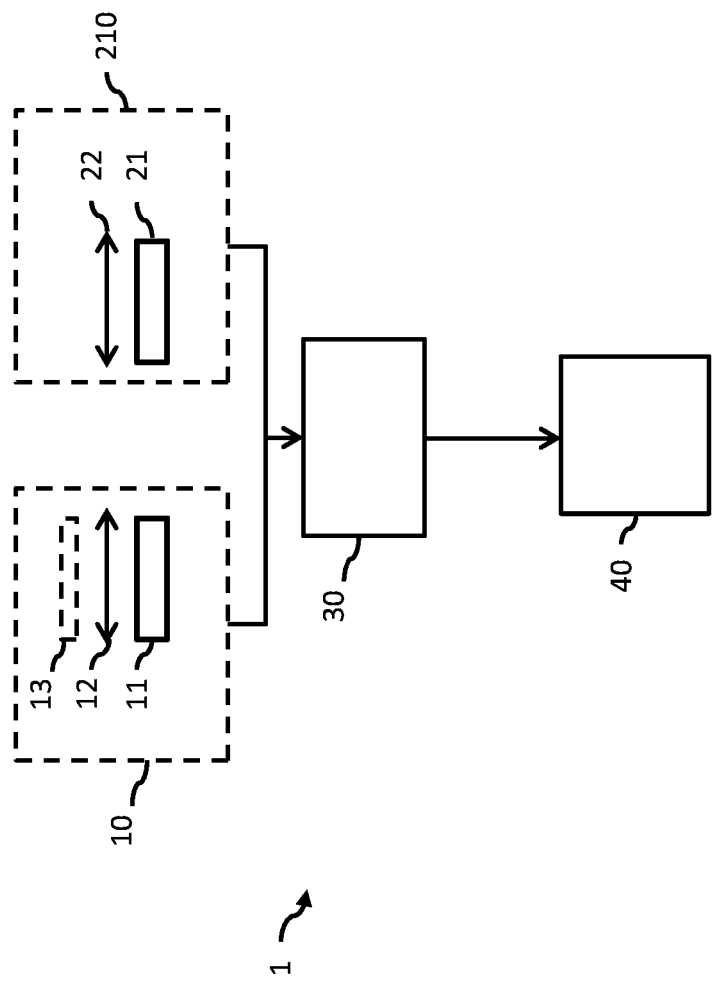

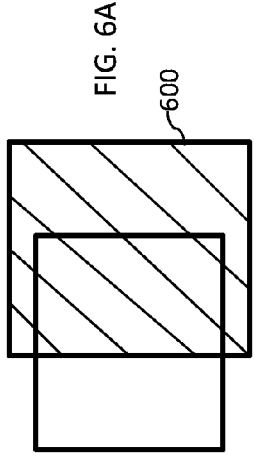
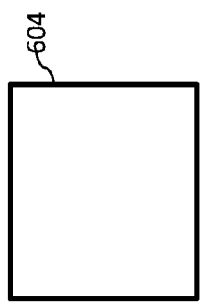
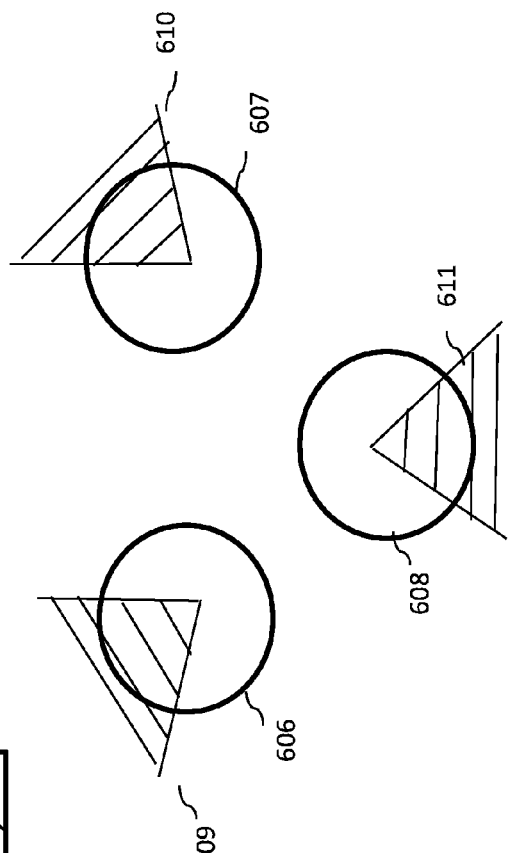
FIG. 6A
FIG. 6B
FIG. 6C

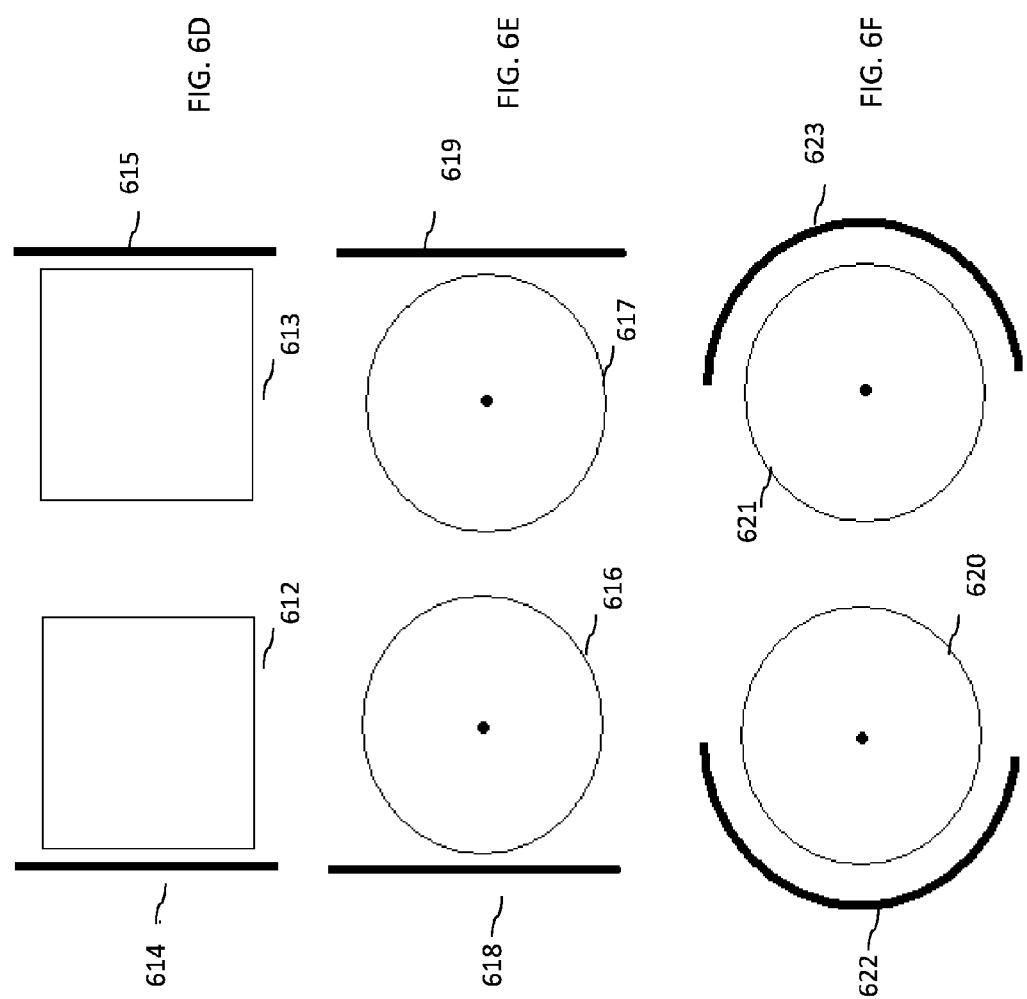

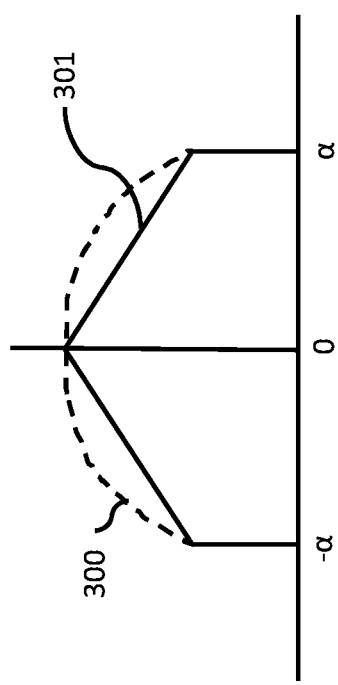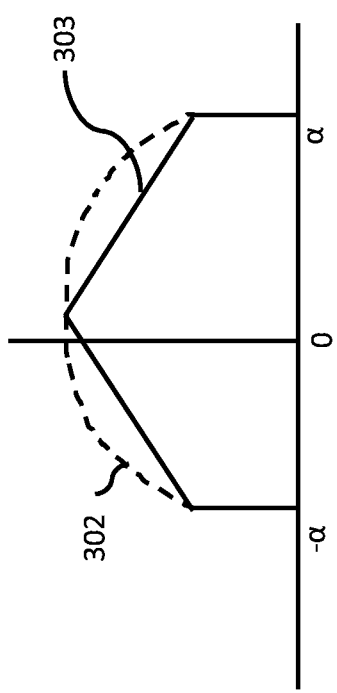

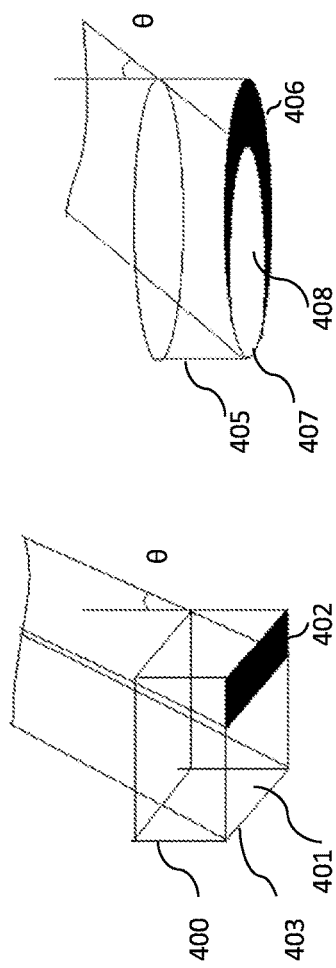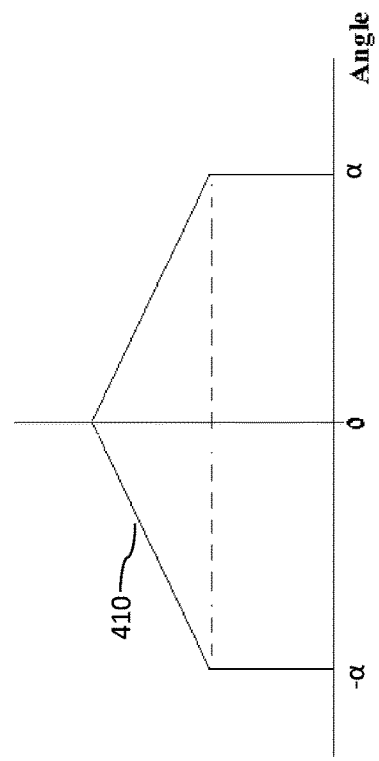
FIG. 11A
FIG. 11B

SYSTEMS AND METHODS FOR FLASH LOCALIZATION USING AT LEAST TWO PHOTODIODES

TECHNOLOGICAL FIELD

The present disclosure relates generally to the field of flash detection. More particularly, the present disclosure relates to systems and methods for determining a direction of a muzzle flash using two or more photodiodes.

BACKGROUND

Accurate muzzle flash detection is generally performed using a matrix camera together with a single lens (or lens system) to locate the shooter. A position of the flash event can be calculated based on a pixel in which the flash event is imaged. Each horizontal and vertical pixel covers a different angle. Searching for short duration events with high amplitudes yields a pixel selection and the event direction can be calculated from the selected pixel. However, imaging solutions are complex, and systems with components (lens and matrix sensors) with the necessary computing requirements are costly, since real-time fast video processing is required.

Another technique illustrated in FIGS. 1A-1B involves a few (2-5) identical and separate sensor modules, each having a photodiode and a collecting optics (lens). Each sensor module is arranged to be oriented towards a different direction. As illustrated in FIG. 1B which shows a typical optical angular efficiency profile of such a sensor module, the optical angular efficiency profile depends on a light incidence angle because the sensor module collects more light from the center relative to the sides. This angular efficiency profile (also called angular transmission profile) is generally generated by most lenses (or filters). A ratio between measured sensor amplitudes can therefore yield a measurement of a source direction. Indeed, because of the offset in the sensor orientations, each sensor has a different angle from the source/event relative to a sensor normal direction.

The ratio between two measurements, A1 and A2, can be expressed as follows:

$$\frac{A_2}{A_1} = \frac{E_1(\theta_1 + \delta)}{E_1(\theta_1)} \Rightarrow \theta_1$$

wherein $E_1$ represents the optical system efficiency function, $\delta$ represents an angle between the orientation of the two sensor modules (shift) and $\theta_1$ represents the source angle. Thus, from a known angular efficiency function, and a given shift, it may be possible to determine the source angle: $\theta_1 = E_1^{-1}(A_1, A_2, \delta)$.

The accuracy of such a measurement depends on the system's Signal to Noise Ratio and on the steepness of the optical efficiency profile. However, it should be noted that generating profiles with a greater or controlled slope generally requires complex lens design such as disclosed in US patent application US2008316462.

Furthermore, it should be noted that the higher the shift $\delta$ between the sensors, the higher the accuracy, since the difference (or ratio) of amplitudes is larger. However, higher shift $\delta$ creates a smaller overlapped field of view. Therefore, in current techniques, accuracy of the system has the opposite correlation with the field of view.

General Description

The present disclosure notably provides systems for passive muzzle flash detection which alleviates, at least in part, limitations of the prior art techniques.

The term muzzle flash includes any short optical flash such as an optical flash generated by gun fire, missile launch, mortars, rockets or laser pointers. The term "event" or "flash" may also be used to refer to a short optical flash.

System Efficiency

When a source produces an event, the event power in a given wavelength band which spreads to a wide spatial angle has radiant intensity J [Watt/strad]. At a large distance R from the source, the event irradiance is H [Watt/mm²] (power density). The amount of power collected by a detection system depends inter alia on the environmental conditions, and on the system's optical parameters.

The major environmental parameter is the atmosphere transparency, that in a given wavelength band has the following relation with R:

$$\tau_{atmosphere} = e^{-\alpha R},$$

where $\alpha$ is the atmosphere transparency coefficient.

The event irradiance H has the following relation with the distance R:

$$H \propto \frac{e^{-\alpha R}}{R^2} \cos\theta,$$

where $\theta$ is the orientation of a sensor of the detection system with respect to the source (angle between the optical axis of the sensor and an axis of the source). If the detection system has a few sensors with the same orientation with respect to the source, and the distance between all sensors and the source is the same, the irradiance H on all sensors is the same, therefore any ratio between the amplitudes measured by the sensors normalizes the range effect.

The system optical parameters involved may include:
- a collection area of an optical collection system of the detection system (e.g. lens aperture) $A_{lens}$,
- transmission coefficients $\tau$ for example through optical elements of the optical collection system such as lenses ($\tau_{lens}$), filters ($\tau(\lambda)_{filter}$, with $\lambda$ the wavelength) or through coupling materials ($\tau_{coupling}$) which may be applied between a sensor of the detection system and the optical collection system: $\tau_{lens}\tau(\lambda)_{filter}\tau_{coupling}$, and
- a sensor responsivity $R_v$ (Watt/Amp) and gain G (Amp/Volt).

The power collected by the optical detection system can be expressed as:

$$P = A_{lens}\tau_{lens}\tau(\lambda)_{filter}\tau_{coupling}H \qquad [1]$$

The amplitude A measured by the detection system can be expressed as:

$$A = R_v GP = R_v G A_{lens}\tau_{lens}\tau(\lambda)_{filter}\tau_{coupling}H \qquad [2]$$

The angular efficiency profile of the detection system can be expressed as:

$$\epsilon = \frac{A(\theta)}{A\max} = \frac{R_v GP(\theta)}{R_v GP\max} = \frac{A_{lens}(\theta)\tau_{lens}(\theta)\tau(\lambda, \theta)_{filter}\tau(\theta)_{coupling}}{A_{lens}\tau_{lens}\tau(\lambda)_{filter}\tau_{coupling}} \qquad [2.1]$$

The angular efficiency profile of the detection system refers to a ratio between the amplitude A measured by the sensor with the irradiance H divided by the maximum measurement of the same source in its optimal angle (usually in the center).

The term H does not appear in the angular efficiency profile since it is cancelled by the division present in equation [2.1].

The angular efficiency profile may also be called an angular transmission profile.

Angular Efficiency Attenuator

As described herein, according to some embodiments, the present disclosure proposes to implement angular efficiency attenuators together with sensor modules as previously described in order to variably attenuate light sensed by the light sensor depending on an incidence angle of a source with respect to the sensor, which may comprise a photodiode (e.g. with respect to a direction normal to the sensor's active surface).

In some embodiments, the angular efficiency attenuators may comprise optical blockers i.e. structures for geometrically preventing light from being collected by the sensor at certain incidence angles, by shadowing of the sensor.

In the following, the term "angular efficiency profile" of an "angular efficiency attenuator" may reflect the optical attenuation rate of the angular efficiency attenuator with respect to the angle of the incident light. The angular efficiency profile may be normalized with respect to a maximum value. In other words, it reflects the ability of the angular efficiency attenuator to transmit (or block) light with respect to the angle of the incident light.

In the following, the term "source angle" or "irradiance source angle" may be defined for example as an angle between a direction orthogonal to the sensor (also referred to as sensor orientation) and the source, or between an optical axis of the sensor and the source.

It is noted that, within the extent of the present disclosure, the angular efficiency profile of the angular efficiency attenuator may be mainly relevant within the field of view of the sensor (photodiode) which is denoted in the following [−α, +α]. The field of view of the sensor may be defined as the 50% response point of the sensor (this value being an example and non-limitative).

In accordance with certain aspects of the presently disclosed subject matter, there is provided a flash detection device comprising at least a first and a second sensor module, wherein each of the sensor modules comprises at least a photodiode for detecting an irradiance emitted by a source, and the first sensor module comprises at least an angular efficiency attenuator configured for attenuating the irradiance received by the photodiode according to a predetermined angular efficiency profile, wherein the at least first and second sensor modules are configured for collecting light from substantially the same field of view, and the angular efficiency attenuator of the first sensor module causes the first and second sensor modules to have complementary predetermined angular efficiency profiles, so that, for angles of view within a common field of view of the first and second sensor modules, a combination of irradiance measurements of the first and second sensor modules enables to derive an irradiance source angle of the source.

According to some embodiments, the second sensor module also comprises at least an angular efficiency attenuator configured for attenuating the irradiance received by the photodiode according to a predetermined angular efficiency profile, and the angular efficiency attenuators of the first and second sensor modules cause the first and second sensor modules to have complementary predetermined angular efficiency profiles, so that, for the angles of view within a common field of view of the first and second sensor modules, a combination of irradiance measurements of the first and second sensor modules enables to derive an irradiance source angle of the source. According to some embodiments, at least one of the sensor modules comprises a camera comprising a plurality of photodiodes. According to some embodiments, the device further comprises an optical element coupled to the photodiode for collecting light on an active area of the photodiode. According to some embodiments, the optical element is a concentrator or a lens. According to some embodiments, the angular efficiency attenuator of at least one of the first and second sensor modules comprises an optical blocker. According to some embodiments, the optical blocker comprises a wall portion arranged at the periphery of the photodiode. According to some embodiments, the optical blocker comprises a roof portion arranged to partially cover an active area of the photodiode. According to some embodiments, the device further comprises an optical element coupled to the photodiode for collecting light on an active area of the photodiode, wherein the optical blocker is arranged on top of the optical element. According to some embodiments, the angular efficiency attenuator of at least one of the first and second sensor modules is an optical structure selected from any of: a lens with positive focal length, a concave concentration mirror, a compound parabolic concentrator, a dielectric compound parabolic concentrator, and a dielectric compound total internal reflector concentrator. According to some embodiments, the angular efficiency attenuator of at least one of the first and second sensor modules is a filter. According to some embodiments, the angular efficiency attenuator of at least one of the first and second sensor modules is a coupling material arranged between the photodiode and an optical element coupled to the photodiode for collecting light on an active area of the photodiode. According to some embodiments, the predetermined angular efficiency profiles of the first and second sensor modules are configured such that at least one predetermined combination of an effective angular efficiency profile of the first sensor module and of an effective angular efficiency profile of the second sensor module is a monotonous function over a predetermined range of angles within the common field of view. According to some embodiments, the predetermined angular efficiency profiles of the first and second sensor modules are configured such that at least one predetermined combination of an effective angular efficiency profile of the first sensor module and of an effective angular efficiency profile of the second sensor module normalizes a distance of the irradiance source. According to some embodiments, the at least one predetermined combination is a ratio between the effective angular efficiency profile of the first sensor module and the effective angular efficiency profile of the second sensor module. According to some embodiments, the at least one predetermined combination is expressed as:

$$R(\theta) = \frac{E_1(\theta) - E_2(\theta)}{E_1(\theta) + E_2(\theta)},$$

wherein E1 and E2 are respectively the angular efficiency profile of the first sensor module and the angular efficiency profile of the second sensor module. According to some embodiments, the photodiodes of the first and second sensor modules have the same wavelength working band. According to some embodiments, the device further comprises a controller module configured for computing the irradiance source angle using signals output by the first and second sensor modules. According to some embodiments, the device is configured for passive muzzle flash detection. According to some embodiments, the angular efficiency attenuators of at least one of the first and second sensor modules comprise optical blockers. According to some embodiments, the predetermined angular efficiency profile of the angular efficiency attenuator of at least one of the first and second sensor modules varies with an azimuth angle and/or with an altitude angle of the source with respect to the flash detection device. According to some embodiments, the angular efficiency attenuator of the first sensor module comprises an optical blocker having a cylindrical shape surrounding the photodiode of the first sensor module so that the predetermined angular efficiency profile of the angular efficiency attenuator of the first sensor module varies with an altitude angle of a source with respect to the flash detection device, and an angular efficiency attenuator of the second sensor module comprises an optical blocker having a spiraled shape surrounding the photodiode of the second sensor module so that the predetermined angular efficiency profile of the angular efficiency attenuator of the second sensor module varies with an azimuth angle of a source with respect to the flash detection device. According to some embodiments, the device further comprises a third reference sensor module including a photodiode, wherein an irradiance measurement on each of the first sensor module, second sensor module and third reference sensor module enables to derive an altitude and azimuth of an irradiance source with respect to the flash detection device. According to some embodiments, there is provided a system including a plurality of said devices.

These embodiments can be combined according to any of their possible technical combinations.

In accordance with some aspects of the presently disclosed subject matter, there is provided a flash detection device comprising at least a first and a second sensor module, wherein each of the sensor modules comprises at least a photodiode and an angular efficiency attenuator configured for attenuating an irradiance received by the photodiode according to a predetermined angular efficiency profile, wherein the first and second sensor modules are configured for collecting light from a partially overlapping field of view.

According to some embodiments, the first sensor module has a first angular efficiency profile when it does not comprise the angular efficiency attenuator, and a second angular efficiency profile when it comprises the angular efficiency attenuator, the second angular efficiency attenuator being closer to an affine function than the first angular efficiency profile, and/or the second sensor module has a third angular efficiency profile when it does not comprise the angular efficiency attenuator, and a fourth angular efficiency profile when it comprises the angular efficiency attenuator, the third angular efficiency attenuator being closer to an affine function than the fourth angular efficiency profile.

According to some embodiments, the flash detection device further comprises a controller module configured for computing an irradiance source angle using signals output by the first and second sensor modules.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2 is a functional diagram illustrating schematically elements of a flash detection device according to embodiments of the present disclosure;

FIG. 2A is a functional diagram illustrating schematically elements of a flash detection device according to another embodiment of the present disclosure;

FIGS. 6A-6C illustrate upper view of examples of flash detection devices including optical blockers according to embodiments of the present disclosure;

FIGS. 6D-6F illustrate upper view of examples of flash detection devices including optical blockers according to other embodiments of the present disclosure;

FIGS. 10A-10B illustrate the angular efficiency profiles the first and second sensor modules of the flash detection device described in FIG. 10, when they comprise an angular efficiency attenuator and when they do not comprise an angular efficiency attenuator;

FIGS. 11A-11B illustrate respectively examples of shapes of angular efficiency attenuators, which may be used in the configuration of FIG. 10A, and an associated angular efficiency profile.

DETAILED DESCRIPTION OF EMBODIMENTS

Figure 1A:
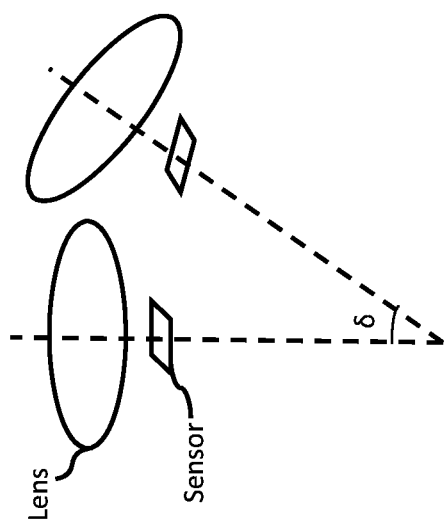
FIGS. 1A-1B, already described, illustrate a prior art technique.
Figure 1B:
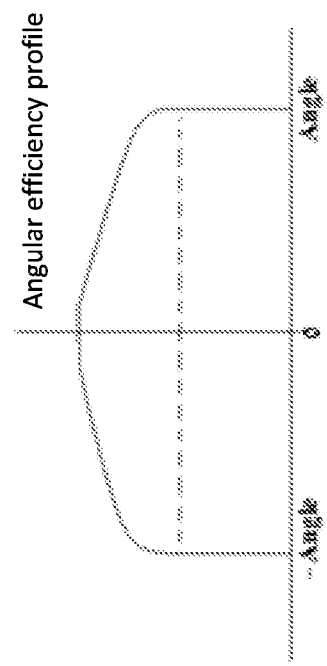

Described herein are some examples of systems and methods useful for accurately determining a direction of a flash, and in particular of a muzzle flash.

In the following detailed description, numerous specific details are set forth in order to provide a thorough understanding of the subject matter. However, it will be understood by those skilled in the art that some examples of the subject matter may be practiced without these specific details. In other instances, well-known methods, procedures and components have not been described in detail so as not to obscure the description.

As used herein, the phrase "for example," "such as", "for instance" and variants thereof describe non-limiting examples of the subject matter.

It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

The term "processing unit" covers any computing unit or electronic unit that may perform tasks based on instructions stored in a memory, such as a computer, a server, a chip, etc. It encompasses a single processor or multiple processors, which may be located in the same geographical zone or may, at least partially, be located in different zones and may be able to communicate together.

Unless specifically stated otherwise, as apparent from the following discussions, it is appreciated that throughout the specification discussions utilizing terms such as "computing", "determining", "using", "deriving", or the like, may refer to the action(s) and/or process(es) of any combination of software, hardware and/or firmware. For example, these terms may refer in some cases to the action(s) and/or process(es) of a processing unit, that manipulates and/or transforms data represented as physical, such as electronic quantities, within the processing unit's registers and/or memories into other data similarly represented as physical quantities within the processing unit's memories, registers and/or other such information storage, transmission and/or display element(s).

FIG. 2 is a functional diagram illustrating generally a flash detection device 1 according to embodiments of the present disclosure. The flash detection device 1 includes at least first and second optical modules 10, 20. The flash detection device may further include a controller module 30 and an output module 40. The controller module 30 can operate on a processing unit (not represented).

The controller module 30 may be configured for computing an irradiance source angle using signals output by the first and second sensor modules 10, 20 in accordance with the method described herein.

The output module 40 may be configured to output the irradiance source angle for example on a display unit.

According to some embodiments, each of the first and second sensor modules 10, 20 comprises a (preferably single) photodiode 11, 21 and an angular efficiency attenuator 13, 23 configured for attenuating an irradiance received by the photodiode according to a predetermined angular efficiency profile. The photodiodes 11, 21 may have substantially the same wavelength working band. Each of the first and second sensor modules 10, 20 may also comprise a collecting optics 12, 22 (optical element) for collecting light on an active area of the photodiode 11, 21. The optical element may for example be a concentrator or a lens. According to some embodiments, the angular efficiency attenuator is different from the optical element.

According to some embodiments, the angular efficiency attenuators 13, 23 of the first and second sensor modules 10, 20 have complementary predetermined angular efficiency profiles which are configured so that, for (preferably all) angles within a common field of view of the first and second sensor modules 10, 20, an irradiance measurement on each of the first and second sensor modules enables to derive an irradiance source angle i.e. an angle between a source of irradiance and the flash detection device 1. In particular, according to some embodiments, a combination of irradiance measurements of the first and second sensor modules may enable to derive the irradiance source angle (depending on the number of sensor modules, this source angle may be calculated according to one or more axis).

Preferably, the first and second sensor modules 10, 20 may be arranged for collecting light from substantially the same field of view. In particular, the first and second sensor modules 10, 20 may be arranged to have collinear orientations (also referred to as an optical axis of the sensor module), or at least, substantial collinear orientations.

According to some embodiments, the difference of orientations between the first and the second sensor modules can be less or equal to 10% of the angular value of the field of view of the first sensor module (or of the second sensor module), or less or equal to 20% of the angular value of the field of view of the first sensor module (or of the second sensor module), or less or equal to any value in this range [0-20%] of the field of view of the first sensor module (or of the second sensor module). These values are, however, not limitative.

In addition, the first and second sensor modules 10, 20 may be arranged to be adjacent.

As explained herein, according to the present disclosure, using complementary angular efficiency profiles enables to derive accurate irradiance source angle while avoiding a need to offset an orientation of the first and second sensor modules, thereby avoiding an unwanted limitation of the common field of view. In the present disclosure, the term "complementary angular efficiency profiles" should be understood to refer to dissimilar angular profiles which are configured so that, for (preferably all) angles within a common field of view of the first and second sensor modules 10, 20, an irradiance measurement on each of the first and second sensor modules enables to derive the irradiance source angle.

In particular, the angular efficiency profile of the first sensor module is complementary to the angular efficiency of the second sensor module, so that a combination of the measurements enables to derive the source angle, even though the first sensor module and the second sensor module have the same orientation.

In some embodiments (see e.g. FIG. 2), this may result notably from the fact that the angular efficiency profile of the angular efficiency attenuator of the first sensor module is dissimilar from the angular efficiency profile of the second sensor module, and the angular efficiency profile of the angular efficiency attenuator of the first sensor module is complementary to the angular efficiency profile of the angular efficiency attenuator of the second sensor module, even though they belong to sensor modules which have the same or substantially the same orientation (or at least the photodiodes of said modules have the same orientation), so that a combination of the measurements enables to derive the source angle.

In other embodiments (see e.g. FIG. 2A), this may result from the fact that the angular efficiency profile of the angular efficiency attenuator of the first sensor module is dissimilar from the angular efficiency profile of the second sensor module and complementary to the angular efficiency profile of the second sensor module (for example in the case when the second sensor module does not comprise an angular efficiency attenuator) even though the first sensor module which comprises said angular efficiency attenuator and the second sensor module have the same, or substantially the same, orientation (or at least the photodiodes of said modules have the same orientation), so that a combination of the measurements enables to derive the source angle.

According to some embodiments, a combination of irradiance measurements of the first and second sensor modules may enable to derive a unique irradiance source angle. Various embodiments are provided later in the specification.

Referring now to FIG. 2A, another possible embodiment of a flash detection device 1 is described. Similar elements are noted with the same reference number.

The flash detection device 1 includes at least first and second optical modules 10, 200. The flash detection device may further include a controller module 30 and an output module 40. The controller module 30 can operate on a processing unit (not represented).

The controller module 30 may be configured for computing an irradiance source angle using signals output by the first and second sensor modules 10, 20 in accordance with the method described herein.

The output module 40 may be configured to output the irradiance source angle for example on a display unit.

Each of the first and second sensor modules 10, 20 may comprise a (preferably single) photodiode 11, 21.

According to this embodiment, the first sensor module 10 comprises an angular efficiency attenuator 13 configured for attenuating an irradiance received by the photodiode according to a predetermined angular efficiency profile, whereas the second sensor module 200 does not comprise an angular efficiency attenuator 13. The second sensor module 200 may be viewed as a reference sensor module.

The photodiodes 11, 21 may have substantially the same wavelength working band. Each of the first and second sensor modules 10, 20 may also comprise a collecting optics 12, 22 (optical element) for collecting light on an active area of the photodiode 11, 21. The optical element may for example be a concentrator or a lens.

According to this embodiment, the angular efficiency attenuator 13 of the first sensor module 10 cause the first and second sensor modules to have complementary predetermined angular efficiency profiles, so that, for (preferably all) angles of view within a common field of view of the first and second sensor modules, a combination of irradiance measurements of the first and second sensor modules enables to derive the irradiance source angle. Examples of complementary predetermined angular efficiency profiles will be provided later in the specification.

Preferably, the first and second sensor modules 10, 200 may be arranged for collecting light from substantially the same field of view. In particular, the first and second sensor modules 10, 200 may be arranged to have collinear orientations (also referred to as an optical axis of the sensor module), or, at least, substantial collinear orientations. In addition, the first and second sensor modules 10, 200 may be arranged to be adjacent.

Figure 2B:
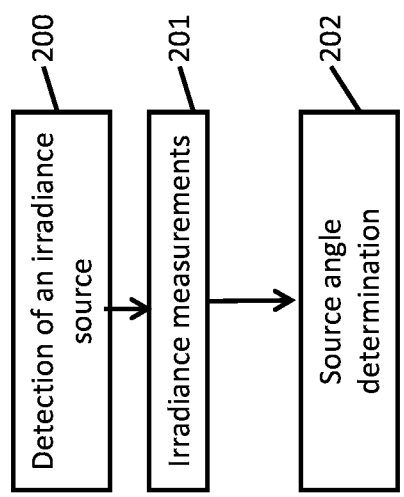
FIG. 2B is a flow-chart of an embodiment of a method for computing a source angle of an irradiance source.

Referring now to FIG. 2B, it describes a generalized flow chart of a method for detecting a flash from a source. As shown in step 200, the flash detection device may first detect the existence of an irradiance source. It may then measure irradiance (step 201) and determine the source angle (step 202).

According to some embodiments, it should be noted that detection of existence of an irradiance source may be performed by detecting the existence of a flash signal on the first and second sensors.

According to some embodiments, detection of existence of a flash may include summing the signals of the sensors involved.

For example, in a two-sensor module configuration as described in FIG. 2 and FIG. 2A, a summed amplitude for event detection may be expressed as:

$A = RvG \ (A_{lens1} + A_{lens2}) \tau_{lens} \tau(\lambda)_{filter} \tau_{coupling} H$, wherein $A_{lens1}$ (resp. $A_{lens2}$) is a collection area of an optical collection system of the first sensor module (resp. second sensor module). The other terms were already defined in equations [1], [2] and [2.1].

A similar equation applies when a larger number of sensor modules is used.

This means that an overall collection area of the sensor is higher than a discrete module. A N-modules (for example N=2, 3, etc.) solution therefore has an N time larger optical collection area, which means improved detection capabilities (and thus longer ranges for detection).

In particular, as mentioned, according to some embodiments flash detection may be performed with at least a first sensor module and a second sensor module which collect light from substantially the same field of view. As a consequence, detection of the existence of a flash may benefit from the sum of the signals of the different sensor modules for (preferably all) the angles of this common field of view.

According to some embodiments, at least the first sensor module and/or the second sensor module comprise a camera comprising a plurality of photodiodes. Again, by summing the signals of the two sensor modules, it is possible to obtain a larger optical collection area with sensors of reduced size. For instance, if the first sensor module comprises a camera with 10*10 pixels (which corresponds to 10*10 photodiodes), and the second sensor module comprises a camera with 10*10 pixels (which corresponds to 10*10 photodiodes), the sum of the amplitudes measured by the two sensor modules is equivalent to a larger sensor of 100*100 pixels, with less processing requirements and reduced cost.

Furthermore, with respect to a four quarter sensors solution, the present disclosure enables, according to some embodiments, the use of non-imaging optics which can produce a much larger collection area than optics with a lens. The four quarter sensors solution requires the use of imaging lenses, and an imaging lens has less light collection capability than a non-imaging light concentrator.

A flash detection device according to at least some embodiments of the present disclosure has a simple architecture, low processing requirements, and low data bandwidth relative to a video processor system. Therefore it is less expensive, and on the other hand the sampling rate is larger than a camera system (for instance, according to some embodiments, two orders of magnitude higher).

Figure 2C:
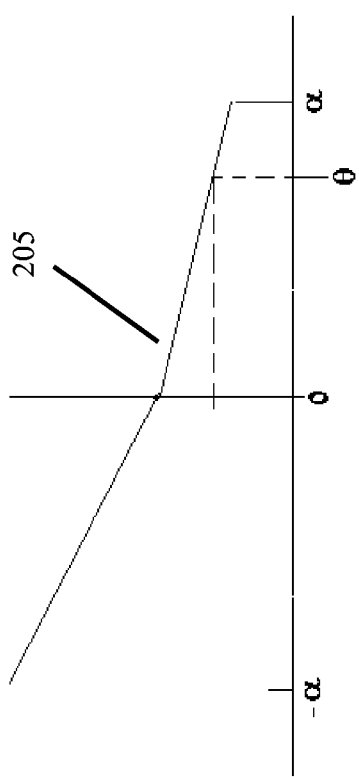
FIG. 2C illustrates a predetermined combination of an angular efficiency profile of a first sensor module and of an angular efficiency profile of a second sensor module.

As illustrated in FIG. 2C, the predetermined angular efficiency profiles of the first and second sensor modules 10, 20 may be configured such that at least one predetermined combination 205 of an angular efficiency of the first sensor module 10 and of an angular efficiency of the second sensor module 20 is a monotonous function over the field of view of the flash detection device thereby enabling to derive an irradiance source angle. According to some embodiments, the combination is an affine function. In FIG. 2C, the function 205 is affine by parts (that is to say affine on each interval of a plurality of intervals of the field of view).

The irradiance source angle may thus be derived from the combination.

Figure 2D:
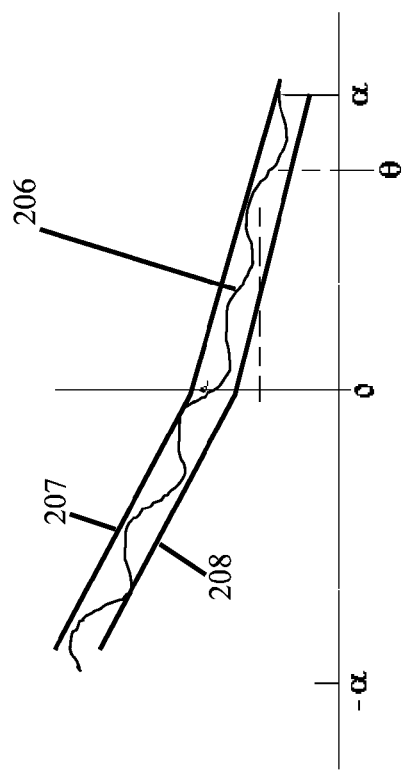
FIG. 2D illustrates a predetermined combination of an angular efficiency profile of a first sensor module and of an angular efficiency profile of a second sensor module.

According to some embodiments, and as illustrated in FIG. 2D, the combination of an angular efficiency profile of the first sensor module 10 and of an angular efficiency profile of the second sensor module 20 is a function 206 which is substantially monotonous over the field of view of the flash detection device thereby enabling to derive an irradiance source angle. Substantially monotonous includes a function 206 which may be contained between two affine functions (or affine by parts), said two affine functions having values which do not differ from the function 206 by more than e.g. 10% or 15% or 20% (see e.g. the two affine functions 207, 208). The more the function 206 tends to be a perfect monotonous function (and in particular an affine function), the better the detection of the source angle.

When the predetermined combination of measurements tends to an affine function, the precision for computing the irradiance source angle is increased.

Figure 3A:
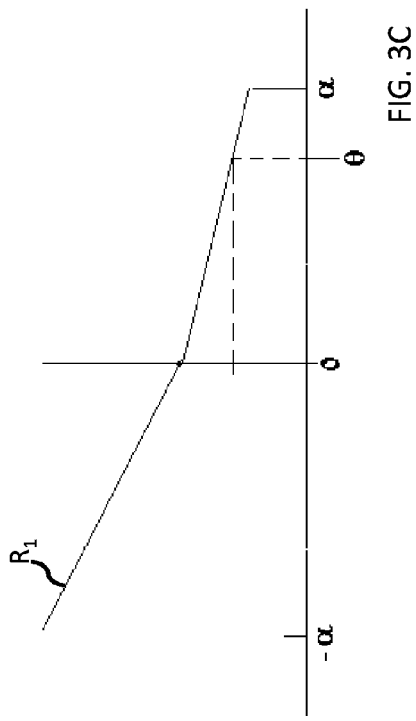
FIGS. 3A-3B illustrate complementary angular efficiency profiles of angular efficiency attenuators according to embodiments of the present disclosure.
Figure 3B:
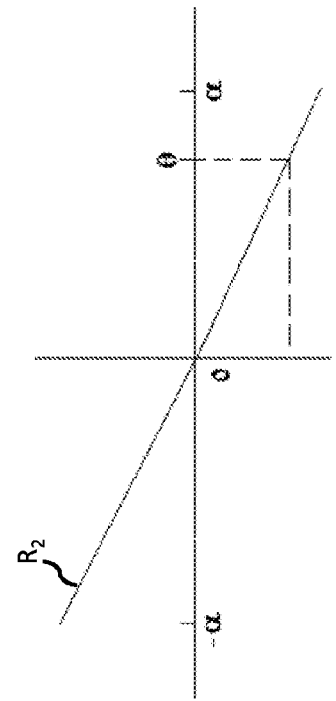

As shown in e.g. FIGS. 3A-3B, the angular efficiency profile may comprise a slope portion with a predetermined slope inclination. A slope angle of the slope portion may be configured for being monotonic with angle. The slope angle determines the resolution, and together with the system internal noise it determines accuracy.

The predetermined combination may normalize a distance between the flash detection device and the irradiance source. This means that the predetermined combination may be independent from a distance between the flash detection device and the irradiance source.

Examples of dissimilar angular efficiency profiles which enable to compute the irradiance source angle based on one measurement on each of at least the two sensor modules are illustrated in FIGS. 3A-3B.

For example, FIG. 3A illustrates a possible angular efficiency profile 113 for the first sensor module 10 and FIG. 3B illustrates a possible angular efficiency profile 123 for the second sensor module 20, over the field of view [−α, +α]. The angular efficiency profile 113 will be referred to as $E_1(\theta)$ and the angular efficiency profile 123 will be referred to as $E_2(\theta)$.

These angular efficiency profiles are obtained by selecting an appropriate angular efficiency profile for the first and second angular efficiency attenuators 13, 23. In this example, the first and second angular efficiency profiles of the first and second angular efficiency attenuators 13, 23 have mirrored shapes within the field of view i.e. $F_1(\theta)=F_2(-\theta)$, wherein $F_1$ and $F_2$ are the angular efficiency profiles of respectively the first and second angular efficiency attenuators 13, 23. It is to be noted that this mirrored shape is a mere non limiting example.

As illustrated, the angular efficiency profiles 113 and 123 may comprise a slope portion and a constant portion.

As mentioned, a predetermined combination of the measurements of the first and second sensor modules enable to derive the source angle.

A possible predetermined combination is to divide the two measurements. Thus, the following relation may be used:

$$R_1(\theta) = \frac{E_1(\theta)}{E_2(\theta)}.$$

Figure 3C:
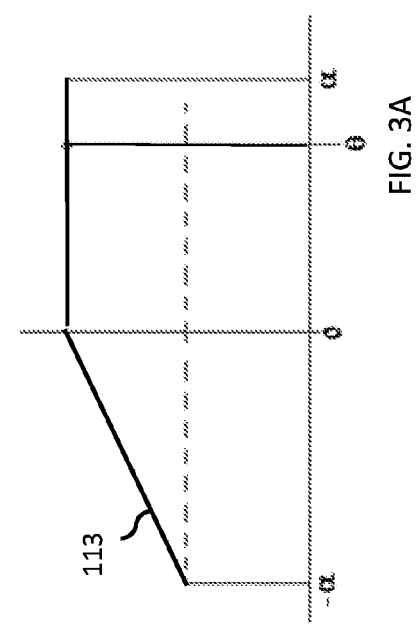
FIGS. 3C-3D illustrate examples of combinations of an effective angular efficiency profile of the first sensor module and of an effective angular efficiency profile of the second sensor module according to embodiments of the present disclosure.

A resulting graph R1 is drawn in FIG. 3C, calculated with the first and second angular efficiency profiles 113, 123 illustrated in FIGS. 3A-3B. As can be seen, the obtained measurements may yield a corresponding source angle θ (with a configuration comprising two sensors, this angle being obtained with respect to an axis, such as elevation or azimuth angle).

In addition, the predetermined combination $R_1$ is independent of a distance between the flash detection device and the source.

A possible predetermined combination is to divide the difference of the two measurements by the sum of the two measurements. Thus, the following relation may be used:

$$R_2(\theta) = \frac{E_1(\theta) - E_2(\theta)}{E_1(\theta) + E_2(\theta)}.$$

Figure 3D:
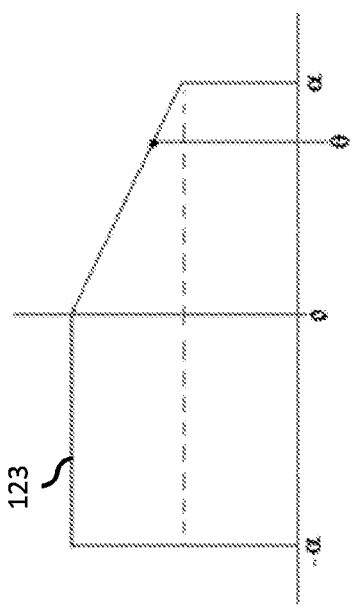

A resulting graph $R_2$ is drawn in FIG. 3D, calculated with the first and second angular efficiency profiles 113, 123 illustrated in FIGS. 3A-3B.

As can be seen, $R_1$ and $R_2$ are monotonous over the field of view so that a measurement on each sensor enables to derive a source angle θ.

The predetermined relations $R_1$ and $R_2$ are only examples and various other possible relations may be used.

Figure 4C:
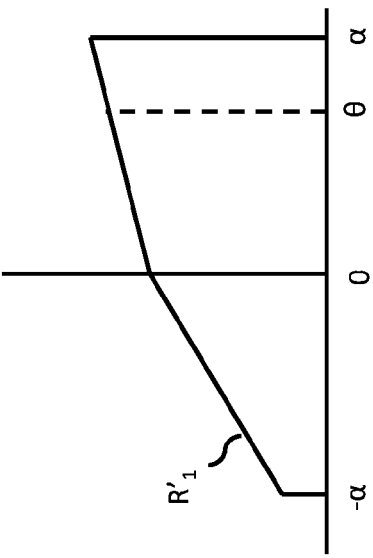
FIG. 4C illustrates examples of a combination of the angular efficiency profiles of FIG. 4A and FIG. 4B.
Figure 4A:
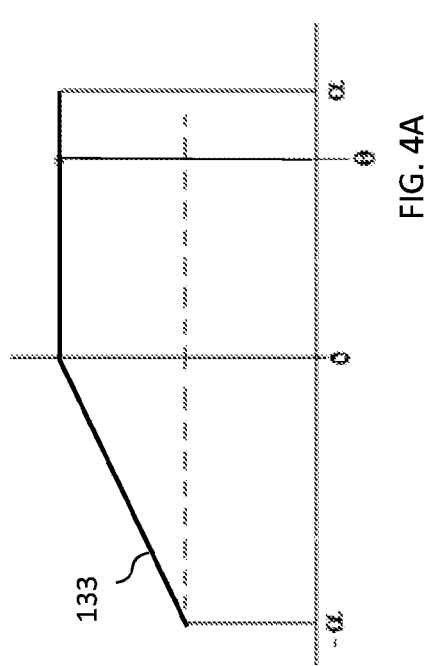
FIGS. 4A-4B illustrate complementary angular efficiency profiles of angular efficiency attenuators according to embodiments of the present disclosure.
Figure 4B:
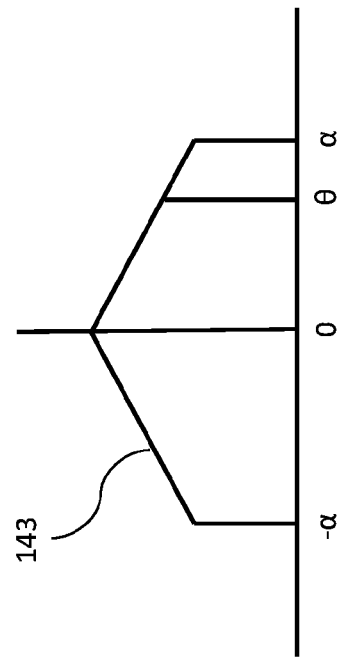

Another possible example which enables to compute the irradiance source angle based on one measurement on each of at least the two sensor modules is illustrated in FIGS. 4A-4C.

For example, FIG. 4A illustrates a possible angular efficiency profile 133 for the first sensor module 10 and FIG. 4B illustrates a possible angular efficiency profile 143 for the second sensor module 200, over the field of view [−α, +α]. The angular efficiency profile 133 will be referred to as $E'_1(\theta)$ and the angular efficiency profile 143 will be referred to as $E'_2(\theta)$.

In particular, FIG. 4B may represent an angular efficiency profile 143 of a second sensor module which does not comprise an angular efficiency attenuator, as described with reference to the second sensor module 200 of FIG. 2A.

A possible predetermined combination is to divide the two measurements. Thus, the following relation may be used:

$$R'_1(\theta) = \frac{E'_1(\theta)}{E'_2(\theta)}.$$

A resulting graph $R'_1$ is drawn in FIG. 4C, calculated with the first and second angular efficiency profiles 133, 143 illustrated in FIGS. 4A-4B. As can be seen, the obtained measurements may yield a corresponding source angle θ (with a configuration comprising two sensors, this angle being obtained with respect to an axis, such as elevation or azimuth angle).

In addition, the predetermined combination $R'_1$ is independent of a distance between the flash detection device and the source.

According to some embodiments, a reference sensor module is used, which does not comprise an angular efficiency attenuator (see e.g. FIG. 2A). The reference sensor may collect light from substantially the same field of view than the other sensor modules.

By dividing the measurements of the at least another sensor module which does comprise an angular efficiency attenuator with the measurements of the reference sensor (such as in the example of FIGS. 4A-C), or by dividing a combination of measurements of a plurality of other sensor modules with the measurements of the reference sensor module, the distance of the flash detection device with the source is normalized (in other words, the obtained combination does not depend on this distance).

The use of a reference sensor to normalize distance may be used for the various embodiments described in the present specification.

Embodiments of angular efficiency attenuators will now be described.

In some embodiments the angular efficiency attenuators 13, 23 are implemented by using optical blockers. In some embodiments, the angular efficiency attenuators 13, 23 are implemented by using optical structures such as a lens with positive focal length, a concave concentration mirror, a compound parabolic concentrator, a dielectric compound parabolic concentrator, a dielectric compound total internal reflector concentrator, etc. In some embodiments, the angular efficiency attenuators 13, 23 are implemented by using filters. Such filters may be manufactured by polishing, molding, stamping and/or printing techniques.

In some embodiments, the angular efficiency attenuators 13, 23 are implemented by using coupling material arranged between the photodiodes 11, 21 and the optical elements 12, 22. The coupling material may be any transparent material that can be applied between the photodiodes 11, 21 and the optical elements 12, 22 such as glue, liquid, gel or gas. For effective coupling, a coupling material's refractive index may be a geometrical average of the sensor's refractive index ($n_{sensor}$) and optical element refractive index ($n_{optics}$):

$$n_{coupling} = \sqrt{n_{sensor} * n_{optics}}$$

In some embodiments, a refractive index lower than the geometrical average may be applied to generate angular profiles comprising slopes with high inclination.

The influence of the coupling material on the angular efficiency profile is expressed by the term $\tau_{coupling}$ in equation [2.1] above.

According to some embodiments a combination of at least one or more of different possible embodiments for the angular efficiency attenuators is used for one or more of the sensor modules.

Figure 5:
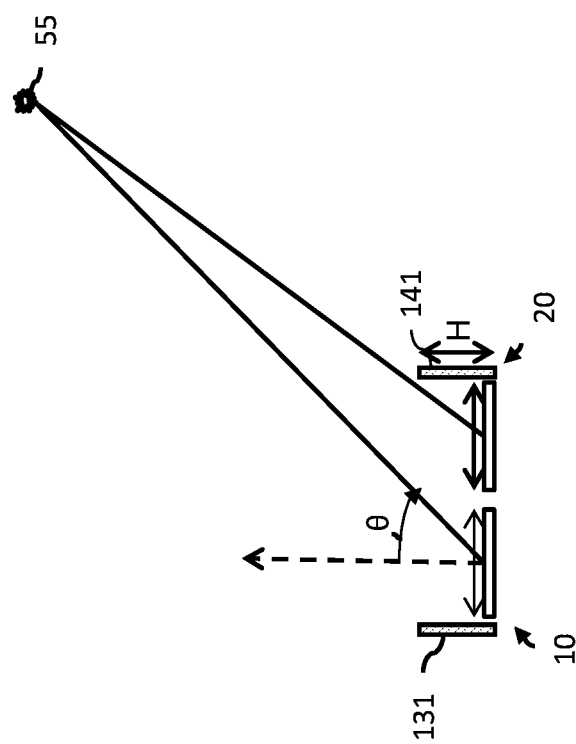
FIG. 5 is a schematic cross section of first and second sensor modules of a flash detection device according to embodiments of the present disclosure.

Referring to FIG. 5, this illustrates a cross section of first and second optical modules 10, 20 using first and second optical blockers 131, 141 as angular efficiency attenuators.

The optical blockers 131, 141 enable to generate complementary angular efficiency profiles by controlling an effective aperture of the optical system due to blocking of the light coming from certain angles (even though the first and second sensor modules have the same or substantially the same spatial orientation). As illustrated, the optical blockers 131, 141 may include a wall portion arranged at the periphery of the photodiodes. Typically, a height H of the wall portion may be of about 0.5 to 2 diameters of the aperture (diameter of the lens), these values being non limiting values. The wall portions of the first and second optical blockers 131, 141 may be positioned so as to generate complementary angular profiles.

Figure 6:
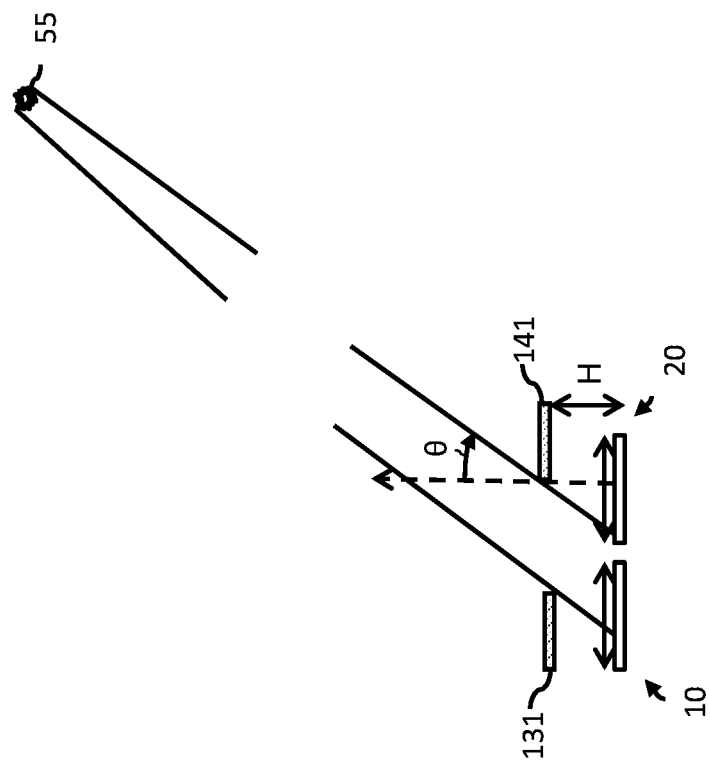
FIG. 6 is a schematic cross section of first and second sensor modules of a flash detection device according to other embodiments of the present disclosure.

According to some embodiments, the wall portions may partially surround the respective photodiode. As illustrated in FIG. 6, the optical blockers 131, 141 may be arranged on top of the optical elements 12, 22.

In some embodiments, and as depicted in FIGS. 6A-6C, the optical blockers may include a roof portion arranged to partially cover an active area of the photodiode. In particular, the roof portions can be designed to cover half or a third of the active areas of the photodiodes of the respective sensor modules.

In a 2-sensor module configuration, two optical blockers comprising a roof portion covering respectively half of each photodiode can yield an azimuth calculation. An example of such a configuration is depicted in FIG. 6A, with the two optical blockers 600 and 601 comprising roof portions.

In FIG. 6B, another configuration is depicted comprising two sensor modules 603, 604 and wherein only one of the two sensor modules is covered by a roof portion 602. The sensor module 604 may be viewed as a reference sensor module.

In a 3-sensor module configuration, three optical blockers comprising roof portions covering a part of each respective photodiode (such as a third of each respective photodiode) can yield an elevation calculation.

An example of such a configuration is depicted in FIG. 6C, with the three optical blockers 609, 610 and 611 comprising roof portions covering respectively a part of the sensor modules 606, 607, and 608.

Figure 7:
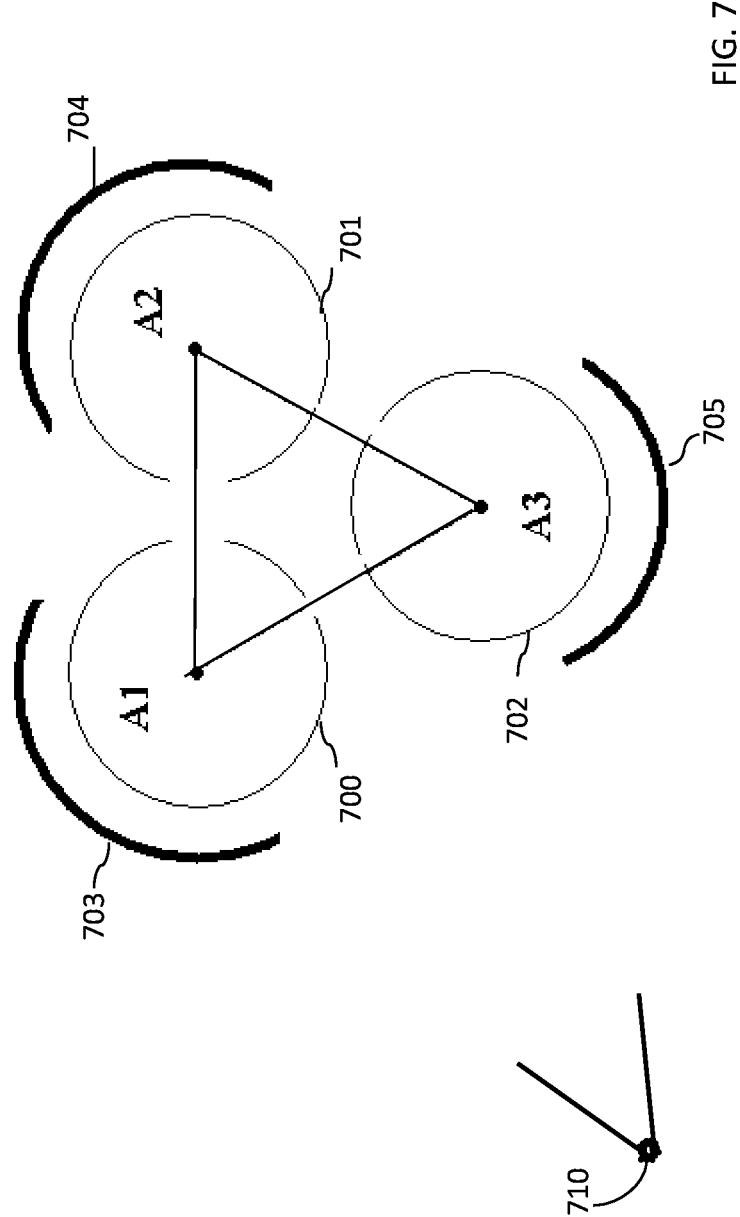
FIG. 7 illustrates an upper view of a flash detection device including three sensor modules and optical blockers according to embodiments of the present disclosure.

As explained further with reference to FIG. 7, the sum of the measurements of the three sensors may be used for normalizing the distance effect, or, again, the measurement of another reference sensor may be used for this purpose.

FIGS. 6D-6F illustrate upper views of several examples of first and second sensor modules implementing optical blockers consisting of a wall portion.

FIG. 6D shows rectangular photodiodes 612, 613 equipped with rectilinear wall portions 614, 615 respectively arranged peripherally at opposite faces of the first and second photodiodes.

FIG. 6E illustrates circular photodiodes 616, 617 equipped with rectilinear wall portions 618, 619 arranged peripherally on opposite sides.

FIG. 6F illustrates circular photodiodes 620, 621 equipped with partial annular wall portions 622, 623 arranged symmetrically on opposite sides. The effective aperture/light collection area may depend on the shadow of blockers on the sensor. The aperture angle dependency of the first and second sensor modules shown on FIGS. 6D-6F may in fact be similar to the angular efficiency profiles presented on FIGS. 3A-3B. The power collected by the sensor modules may be expressed as:

$$P(\theta) = A_{lens}(\theta)\tau_{lens}\tau(\lambda)_{filter}\tau_{coupling}H$$

Therefore, the measured amplitude is angle dependent, each angle producing a different amplitude, and therefore according to the amplitude it is possible to calculate the source angle, provided that the distance of the source is normalized by using an appropriate relation between the measurements.

When two sensor modules are used, the source angle along one axis (such as azimuth or elevation, said source angle being noted $\theta_{horizontal}$) may be computed. In order to convert the predetermined combination of measurements of the two sensor modules into a source angle, a possible calculation could be:

$$\theta_{horizontal} = \theta_{fov} \frac{A1 - A2}{A1 + A2}$$

wherein A1, A2 are two measured amplitude, and $\theta_{fov}$ is the field of view of the sensors (all sensors have the same field of view).

As already mentioned, another way to normalize distance is to use a reference sensor such as the one described in FIGS. 2A, 4B and 6B. In this case, the following calculation could be used ($A_{reference}$ is the amplitude measured by the reference sensor):

$$\theta_{horizontal} = \theta_{fov} \frac{A1 - A2}{Areference}$$

As illustrated in FIG. 7, it should be noted that the same method of blocking as the one described with reference to FIGS. 6A-6F can be generalized to more sensors. For example 3 (or more) sensors 700, 701, 702 may enable to determine direction with respect to an additional axis (such as the vertical axis, in addition to the horizontal axis). Therefore, a flash detection device including three sensor modules may provide an exact shooter bearing, for example from 3 measured amplitudes A1, A2, A3 on the three sensors equipped each with an angular efficiency attenuator 703, 704, 705.

As illustrated in FIG. 7, the three sensor modules may be disposed so as to be centered on apexes of a triangle such as an equilateral triangle. The three photodiodes may be of a circular type. The optical blockers may be partial annular walls at the periphery of the sensors.

When three sensor modules are used (for example as the one depicted in FIG. 7), a source angle $\theta_{horizontal}$ with respect to an horizontal axis (azimuth angle) can be computed with the following formula:

$$\theta_{horizontal} = \theta_{fov} \frac{A1 - A2}{A1 + A2}$$

A1 is the amplitude sensed on sensor module 700 and A2 is the amplitude sensed by sensor module 701.

In this formula, the distance with the source is normalized by dividing by the sum of two amplitudes measured by the sensors.

According to other embodiments, since, for every angle, one of the sensors is not shaded (in the example of FIG. 7 with the source 710, the sensor module 701 is not shaded), the distance can be normalized by the non-shadowed signal which is the maximum between A1, A2, A3:

$$\theta_{horizontal} = \theta_{fov} \frac{A1 - A2}{\max(A1, A2, A3)}$$

It should be noted that other combinations may be used for the lower part of the fraction as well as for the upper part of the fraction of the above relation.

According to some embodiments, another reference sensor is used to normalize distance (Areference), in a similar way to that described in FIGS. 2A, 4B and 6B:

$$\theta_{horizontal} = \theta_{fov} \frac{A1 - A2}{Areference}$$

As mentioned, a configuration with at least three sensor modules enables to derive the source angle ($\theta_{vertical}$) with respect to another axis, such as the vertical axis (elevation). Similar relations can be used for this additional axis, such as one of the following:

$$\theta_{vertical} = \theta_{fov} \frac{A3 - A2}{A3 + A2}$$

$$\theta_{vertical} = \theta_{fov} \frac{A3 + A2 - 2A1}{A3 + A2 + A1}$$

$$\theta_{vertical} = \theta_{fov} \frac{A3 - A2}{\max(A1, A2, A3)}$$

$$\theta_{vertical} = \theta_{fov} \frac{A3 - A2}{Areference}$$

Other combinations may be used.

According to some embodiments, two of the three sensor modules comprise an angular efficiency attenuator and the third sensor module is a reference sensor which does not comprise an angular efficiency attenuator. At least a first pair of sensor modules among the three sensor modules has complementary angular efficiency profile, and at least another pair of sensor modules among the three sensor modules has complementary angular efficiency profile.

If more than three sensor modules are used, additional combinations of complementary angular efficiency profiles of a pair of sensor modules among the plurality of sensor modules may be used to confirm or improve the computation of the source angle along a corresponding axis.

Figure 8:
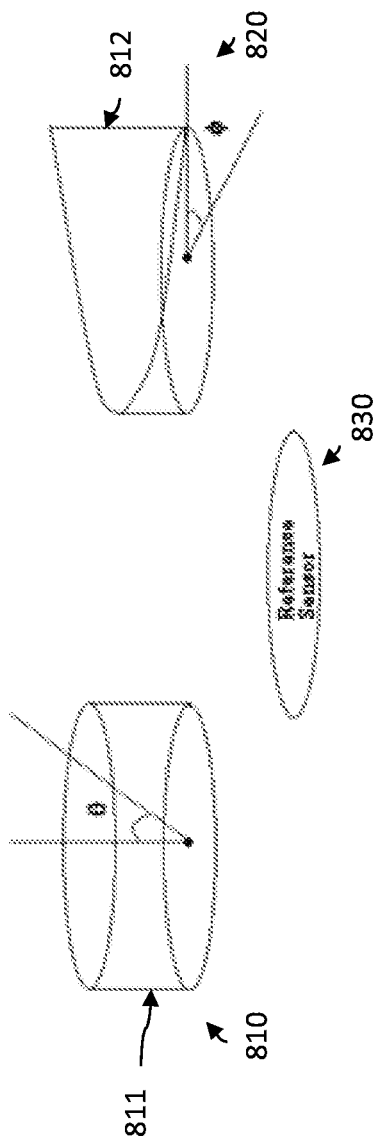
FIG. 8 illustrates schematically a flash detection device according to embodiments of the present disclosure.

Referring to FIG. 8, this illustrates a flash detection device according to embodiments of the present disclosure, with particular angular efficiency attenuators. The flash detection device may include first and second sensor modules 810, 820 and a reference sensor module 830. Each of the first and second sensor modules comprises an angular efficiency attenuator.

The angular efficiency attenuator 811 of the first sensor module 810 comprises an optical blocker having a cylindrical shape surrounding the photodiode of the first sensor module so that the predetermined angular transmission profile of the angular efficiency attenuator of the first sensor modules varies with an elevation angle $\theta$ of a flash with respect to the flash detection device.

The angular efficiency attenuator 812 of the second sensor module 820 comprises an optical blocker having a spiraled shape surrounding the photodiode of the second sensor module so that the predetermined angular efficiency profile of the angular efficiency attenuator of the second sensor modules varies with an azimuth angle $\phi$ of a flash with respect to the flash detection device.

In this embodiment an irradiance measurement $A_{cylinder}$, $A_{spiral}$, $A_{reference}$, on each of the first, second and reference sensors enables to derive an irradiance source elevation and azimuth angle with respect to the flash detection device.

The two angular efficiency attenuators described above illustrate the concept of blocking light in order to achieve different effective collection area and therefore different efficiency over different irradiance source angles.

In this embodiment, the cylinder blocker 811 transfers maximum light when facing the irradiance source i.e. when $\theta=0$. The cylinder blocker blocks all the light when the sensor's entire surface is in the blocker's shadow.

For example, the measured ratio $$\frac{A_{Cylinder}(\theta)}{A_{ref}(\theta)}$$

may normalize the distance and can yield the source elevation angle $\theta$, since for every angle $\theta$ there is a different ratio.

In a similar way, with a given calculated θ, the spiral blocker 812 may generate a spiral shadow and therefore can provide angular accuracy at different angles ϕ, for example from the following ratio $$\frac{A_{spiral}(\phi, \theta)}{A_{ref}(\phi)}.$$

The source azimuth angle may be found with the relation $$\phi = 360 \frac{A_{spiral}(\theta)}{A_{ref}}.$$

Together, θ and ϕ are the polar bearing of the irradiance source.

Figure 9B:
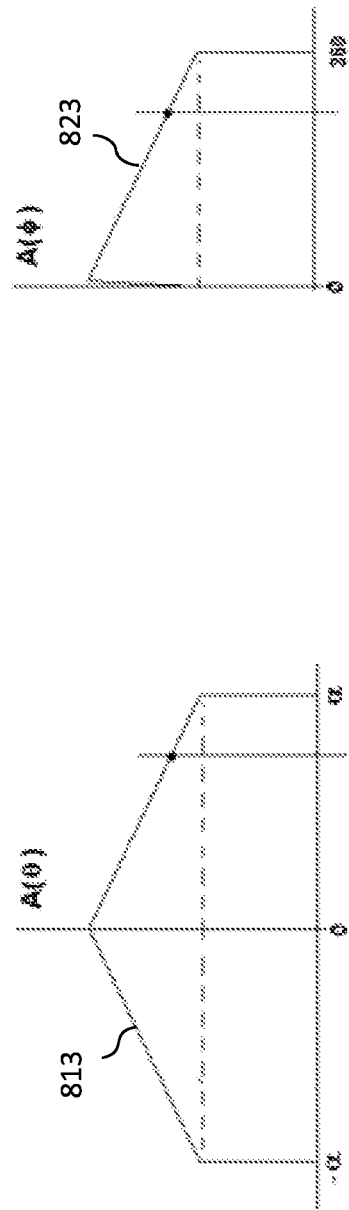
FIGS. 9A-9B illustrate the angular efficiency profiles of the angular efficiency attenuators associated with the first and second sensor modules of the flash detection device described in FIG. 8.
Figure 9A:
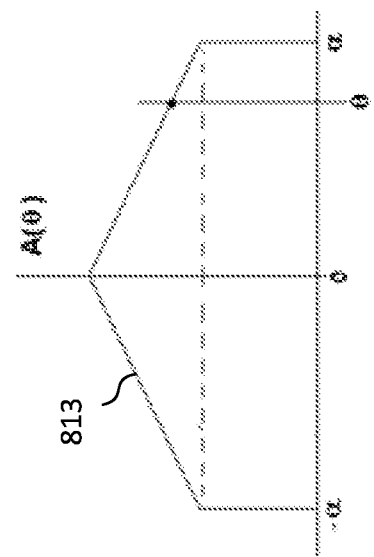

FIGS. 9A-9B illustrate angular efficiency profiles 813, 823 of the first and second optical blockers 811, 812 of FIG. 8 respectively with respect to an elevation angle and to an azimuth angle.

In this case, one sensor may be designed to be sensitive to variation of one polar angle while the second may be designed to be sensitive to another polar angle. Therefore, together they provide high accuracy measurement for a direction of a shooter.

When using dissimilar sensors having dissimilar curves of efficiency, a more precise direction can be calculated while all sensors are facing the same field of view. An accurate flash detection device may include a few sensor modules, for example 2, 3 or 4 sensor modules, or more.

As explained above, the angular efficiency dependency can be controlled by using lenses, filters, coupling material between the sensor and a collecting optics, or an optical blocker configured for providing an angle dependent collection area. Therefore, the power collected by the system can be expressed as follows (the relation depends on which angular efficiency attenuators are used):

$P=\{A_{lens}(\theta,\phi)\tau_{lens}\tau(\lambda)_{filter}\tau_{coupling}\}H$, or $P=\{A_{lens}\tau_{lens}(\theta,\phi)\tau(\lambda)_{filter}\tau_{coupling}\}H$, or $P=\{A_{lens}\tau_{lens}\tau_{filter}(\lambda,\theta,\phi)\tau_{coupling}\}H$, or $P=\{A_{lens}\tau_{lens}\tau(\lambda)_{filter}\tau_{coupling}(\theta,\phi)\}H$, or $P=\{A_{lens}(\theta,\phi)\tau_{lens}(\theta,\phi)\tau_{filter}(\lambda,\theta,\phi)\tau_{coupling}(\theta,\phi)\}H$.

Figure 10:
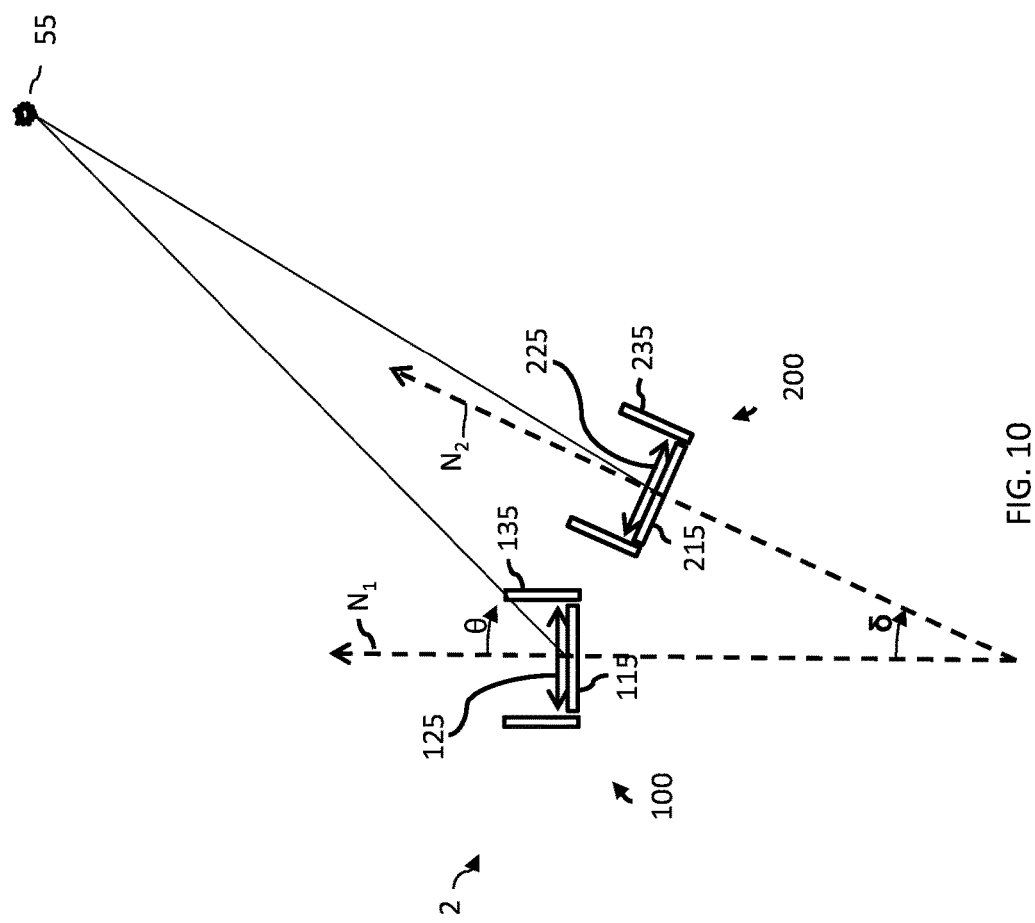
FIG. 10 illustrates a schematic cross section of first and second sensor modules of a flash detection device according to a variant of the present disclosure.

FIG. 10 illustrates a flash detection device 2 according to a variant of the present disclosure.

The flash detection 2 includes a first optical module 100 and a second optical module 200. The first and second optical modules 100, 200 each include a single photodiode 115, 215, and at least an angular efficiency attenuator 135, 235. The angular efficiency attenuators 135, 235 may be of the same type as previously described i.e. the angular efficiency attenuators 135, 235 are configured for attenuating an irradiance received by the photodiode according to a predetermined angular transmission profile by shadowing (an active area) of the photodiode. In this embodiment, the angular efficiency attenuators 135, 235 do not necessarily need to have complementary angular efficiency profiles, since, as illustrated in FIG. 10, the first and second optical modules are already angularly offset.

The first and second optical modules 100, 200 may also include collecting optics 125, 225 for collecting light on an active area of the photodiodes 115, 215. The first and second sensor modules 100, 200 may be configured for collecting light from a partially overlapping field of view. As illustrated, the first and second sensor modules 100, 200 may be configured so that an orientation of the first sensor module is offset with respect to an orientation of the second sensor module. An offset δ of orientation between the first and second sensor modules 100, 200 may be defined with respect to the sensors' normal directions $N_1$, $N_2$. Typically, an offset δ may be of about ¼ to ½ of the field of view of the flash detection device 2.

The flash detection device 2 may further comprise a controller module (not shown) configured for computing an irradiance source angle θ that an irradiance source 55 makes with the flash detection device 2. The computation may be based on using signals output by the first and second sensor modules. Preferably, the first and second modules 100, 200 may have a similar predetermined angular transmission profile i.e. the angular efficiency attenuators 135, 235 may be similar. In some embodiments, the first and second sensor modules 100, 200 may be identical.

FIG. 10A illustrates the angular efficiency profile 300 of the first optical module 100 when it does not comprise an angular efficiency attenuator (such as the angular efficiency attenuator 135). FIG. 10A also illustrates the angular efficiency profile 301 of the first optical module 100 when it comprises an angular efficiency attenuator (such as the angular efficiency attenuator 135).

The angular efficiency attenuator shapes the angular efficiency profile of the first optical module.

As can be seen, the angular efficiency profile 301 is closer to an affine function (affine by parts) than the angular efficiency profile 300, which thus allows a better computation of the source angle when combined with the angular efficiency profile of the other optical module 200.

Similarly, FIG. 10B illustrates the angular efficiency profile 302 of the second optical module 200 when it does not comprise an angular efficiency attenuator (such as the angular efficiency attenuator 235). FIG. 10B also illustrates the angular efficiency profile 302 of the second optical module 200 when it comprises an angular efficiency attenuator (such as the angular efficiency attenuator 235).

The angular efficiency attenuator shapes the angular efficiency profile of the second optical module.

As can be seen, the angular efficiency profile 303 is closer to an affine function (affine by parts) than the angular efficiency profile 302, which thus allows a better computation of the source angle when combined with the angular efficiency profile of the other optical module 100.

Referring to FIG. 11A, this describes possible embodiments for angular efficiency attenuators. These angular efficiency attenuators may also be used in the configuration described with respect to FIG. 10. As illustrated in FIG. 11A, the angular efficiency attenuator 400 may have a rectangular frame shape when the photodiode 403 is rectangular. FIG. 11A also illustrates the collection area 401 of the photodiode 403, where light may be collected, and the blocked area 402 of the photodiode 403, where light is blocked, for an elevation angle θ.

FIG. 11A also illustrates that the angular efficiency attenuator 405 may have a cylinder shape when the photodiode 407 is circular. FIG. 11A also illustrates the collection area 408 of the photodiode 407, where light may be collected, and the blocked area 406 of the photodiode 407, where light is blocked, for an elevation angle θ.

FIG. 11B illustrates an angular efficiency profile 410 of sensor modules comprising one of the angular efficiency attenuators 400, 405 illustrated in FIG. 11A.

As shown in FIG. 10A and FIG. 10B, the use of angular efficiency attenuators, such as the optical blockers described in FIG. 11A, or such as the various angular efficiency attenuators that were described in the previous embodiments, improves the angular efficiency profile of the sensor modules, even in the configuration of the prior art wherein the orientation of one of the sensor modules is offset with respect to the orientation of the other sensor module. In particular, the angular efficiency attenuators may enable to control the slope of the angular efficiency profile of the sensor modules, with a simple design.

The power collected by the modules in this case may be calculated as follows:

$$P = A_{lens}(\theta) \tau_{lens} \tau(\lambda)_{filter} \tau_{coupling} H$$

wherein $A_{lens}$ is a lens collection area. In the present variant, the effective $A_{lens}(\theta)$ is $\theta$ dependent because of the optical blockers. A geometrical relation between the collection area and $\theta$ may be expressed as follows (for a square sensor, when an optical blocker such as optical blocker 400 is used):

$$A_{lens}(\theta) = d_{lens}[d_{lens} - h_{blocker} \tan(\theta)]$$

In this relation, $d_{lens}$ is the lens diameter of the sensor module, $h_{blocker}$ is the blocker height (fixed parameters of the system) and $\theta$ is the source angle.

As already mentioned, the above described sensor module yields an almost linear curve for the angular efficiency with a controlled slope as shown on FIG. 11B.

It should be noted that when direction of the irradiance source is to be determined with reference to three axes, a third sensor module, and optionally a fourth sensor module may be implemented in a flash detection device according to the presently described variant.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

While various embodiments have been shown and described, it will be understood that there is no intent to limit the invention by such disclosure, but rather, it is intended to cover all modifications and alternate constructions falling within the scope of the invention, as defined in the appended claims.

The invention claimed is:

1. A flash detection device comprising at least a first and a second sensor module, wherein each of the sensor modules comprises at least a photodiode for detecting an irradiance emitted by a source, and the first sensor module comprises:
    at least an angular efficiency attenuator configured for attenuating the irradiance received by the photodiode according to a predetermined angular efficiency profile, wherein:
    the at least first and second sensor modules are configured for collecting light from substantially the same field of view, and
    the angular efficiency attenuator of the first sensor module causes the first and second sensor modules to have complementary predetermined angular efficiency profiles, so that, for angles of view within a common field of view of the first and second sensor modules, a combination of irradiance measurements of the first and second sensor modules enables to derive an irradiance source angle of the source.

2. The device according to claim 1, wherein
the second sensor module also comprises at least an angular efficiency attenuator configured for attenuating the irradiance received by the photodiode according to a predetermined angular efficiency profile, and
the angular efficiency attenuators of the first and second sensor modules cause the first and second sensor modules to have complementary predetermined angular efficiency profiles, so that, for the angles of view within a common field of view of the first and second sensor modules, a combination of irradiance measurements of the first and second sensor modules enables to derive an irradiance source angle of the source.

3. The device according to claim 1, wherein
at least one of the sensor modules comprises a camera comprising a plurality of photodiodes.

4. The device according to claim 1, wherein
the angular efficiency attenuator of at least one of the first and second sensor modules is selected from any of: a lens with positive focal length, a concave concentration mirror, a compound parabolic concentrator, a dielectric compound parabolic concentrator, a dielectric compound total internal reflector concentrator, a coupling material arranged between the photodiode and an optical element coupled to the photodiode for collecting light on an active area of the photodiode, an optical blocker comprising a wall portion arranged at the periphery of the photodiode, an optical blocker comprising a roof portion arranged to partially cover an active area of the photodiode and a filter.

5. The device according to claim 1, wherein
the predetermined angular efficiency profiles of the first and second sensor modules are configured such that at least one predetermined combination of an effective angular efficiency profile of the first sensor module and of an effective angular efficiency profile of the second sensor module is a monotonous function over a predetermined range of angles within the common field of view.

6. The device according to claim 1, wherein
the predetermined angular efficiency profiles of the first and second sensor modules are configured such that at least one predetermined combination of an effective angular efficiency profile of the first sensor module and of an effective angular efficiency profile of the second sensor module normalizes a distance of the irradiance source.

7. The device according to claim 5 wherein
the at least one predetermined combination is a ratio between the effective angular efficiency profile of the first sensor module and the effective angular efficiency profile of the second sensor module.

8. The device according to claim 5, wherein
the at least one predetermined combination is expressed as:

$$R(\theta) = \frac{E_1(\theta) - E_2(\theta)}{E_1(\theta) + E_2(\theta)}$$

wherein $E_1$ and $E_2$ are respectively the angular efficiency profile of the first sensor module and the angular efficiency profile of the second sensor module.

9. The device according to claim 1, wherein
the photodiodes of the first and second sensor modules have same wavelength working band.

10. The device according to claim 1, further comprising
a controller module configured for computing the irradiance source angle using signals output by the first and second sensor modules.

11. The device according to claim 1, being configured for passive muzzle flash detection.

12. The device according to claim 1, wherein
the predetermined angular efficiency profile of the angular efficiency attenuator of at least one of the first and second sensor modules varies with an azimuth angle and/or with an altitude angle of the source with respect to the flash detection device.

13. The device according to claim 1, wherein:
the angular efficiency attenuator of the first sensor module comprises an optical blocker having a cylindrical shape surrounding the photodiode of the first sensor module so that the predetermined angular efficiency profile of the angular efficiency attenuator of the first sensor module varies with an altitude angle of a source with respect to the flash detection device;
an angular efficiency attenuator of the second sensor module comprises an optical blocker having a spiraled shape surrounding the photodiode of the second sensor module so that the predetermined angular efficiency profile of the angular efficiency attenuator of the second sensor module varies with an azimuth angle of a source with respect to the flash detection device.

14. The device according to claim 2, further comprising
a third reference sensor module including a photodiode and wherein an irradiance measurement on each of the first sensor module, second sensor module and third reference sensor module enables to derive an altitude and azimuth of an irradiance source with respect to the flash detection device.

15. A system including a plurality of devices according to claim 1.

16. A flash detection device comprising at least a first and a second sensor module, wherein each of the sensor modules comprises:
(a) at least a photodiode; and
(b) an angular efficiency attenuator configured for attenuating an irradiance received by the photodiode according to a predetermined angular efficiency profile;
wherein the first and second sensor modules are configured for collecting light from a partially overlapping field of view, and wherein
the first sensor module has a first angular efficiency profile when it does not comprise the angular efficiency attenuator, and a second angular efficiency profile when it comprises the angular efficiency attenuator, the second angular efficiency profile being closer to an affine function than the first angular efficiency profile, and/or
the second sensor module has a third angular efficiency profile when it does not comprise the angular efficiency attenuator, and a fourth angular efficiency profile when it comprises the angular efficiency attenuator, the third angular efficiency profile being closer to an affine function than the fourth angular efficiency profile.

17. The flash detection device according to claim 16, further comprising
a controller module configured for computing an irradiance source angle using signals output by the first and second sensor modules.

18. The flash detection device according to claim 16, wherein
the first and second sensor modules are configured so that an orientation of the first sensor module is offset with respect to an orientation of the second sensor module.

19. The flash detection device according to claim 16, wherein
the first and second sensor modules have similar predetermined angular efficiency profiles.

* * * * *